United States Patent

Abe et al.

[11] Patent Number: 6,108,216
[45] Date of Patent: Aug. 22, 2000

[54] NON-CONTACT ELECTRICAL POWER TRANSMISSION SYSTEM

[75] Inventors: Hideaki Abe, Neyagawa; Hiroshi Sakamoto, Kumamoto; Kosuke Harada, Fukuoka, all of Japan

[73] Assignee: Matsushita Electric Works, Ltd., Kadoma, Japan

[21] Appl. No.: 09/407,761

[22] Filed: Sep. 29, 1999

[30] Foreign Application Priority Data

Feb. 23, 1999 [JP] Japan ................................. 11-045422

[51] Int. Cl.$^7$ ................................................ H02M 3/335
[52] U.S. Cl. ............................................. 363/17; 363/19
[58] Field of Search ................................ 363/17, 19, 132

[56] References Cited

U.S. PATENT DOCUMENTS

| | | | |
|---|---|---|---|
| 5,638,260 | 6/1997 | Bees | ........................................... 363/17 |
| 5,886,516 | 3/1999 | Barrett | ..................................... 323/331 |

FOREIGN PATENT DOCUMENTS 6-178464  6/1994  Japan .

OTHER PUBLICATIONS

Hideaki Abe, et al. "A Non–Contact Charger Using a Resonant Converter with Parallel Capacitor of the Secondary Coil", IEEE, 1998, pp. 136–141. no month.

*Primary Examiner*—Shawn Riley
*Attorney, Agent, or Firm*—Oblon, Spivak, McClelland, Maier & Neustadt, P.C.

[57] ABSTRACT

A non-contact electrical power transmission system is capable of providing a large supply current of uniform level at an optimum transmission efficiency. The system includes a power circuit including a power supply of providing a high frequency voltage across a power winding, and a load circuit for energizing a load. The load circuit is composed of a secondary winding, a matching capacitor, a rectifier, and a choke coil. The secondary winding is magnetically coupled to the power winding so as to generate an induced high frequency voltage and to provide a leakage inductance to the load circuit. The matching capacitor is connected across the secondary winding to be cooperative with the leakage inductance and with the secondary winding to form an oscillatory circuit which provides an oscillating voltage across the matching capacitor for generating a supply current being fed through the rectifier and the choke coil to the load. The matching capacitor is selected to have a specific capacitance such that the oscillating voltage reaches its extreme each time the inducted high frequency voltage reverses its polarity. The choke coil is connected in circuit to smoothen the supply current. Thus, the supply current of uniform level can be fed to the load, reducing a possibility of incurring a noise on the supply current, yet minimizing an impedance between the supply circuit and the load circuit for realizing an optimum efficiency of converting the high frequency voltage into the supply current.

11 Claims, 12 Drawing Sheets

NON-CONTACT ELECTRICAL POWER TRANSMISSION SYSTEM

BACKGROUND OF THE INVENTION

1. Field of the Invention

The present invention is directed to a non-contact electrical power transmission system, and more particularly to a system of transmitting an electric power from a high frequency voltage source to a load in non-contact manner through a transformer with separable power and secondary windings.

2. Description of the Prior Art

The inventors disclosed "A Non-Contact Charger Using a Resonant Converter with Parallel Capacitor of the Secondary Coil" in a paper at pages 136 to 141, volume 1 presented at "Thirteenth Annual Applied Power Electronic Conference and Exposition (APEC '98)" on Feb. 15–19, 1998 at The Disneyland Hotel, Anaheim, Calif., U.S.A. The paper describes a charger system which is composed of a charger circuit including a power supply of providing a high frequency voltage across a power winding, and a load circuit for charging a rechargeable battery. The load circuit comprises a secondary winding, a matching capacitor, and a rectifier. The secondary winding, which is separable from the power winding, is magnetically coupled to the power winding so as to generate an induced high frequency voltage and to provide a leakage inductance to the load circuit. The matching capacitor is connected across the secondary winding to be cooperative with the leakage inductance and with the secondary winding to form an oscillatory circuit which provides an oscillating voltage across the matching capacitor for generating a supply current being fed through the rectifier to the battery. The matching capacitor is selected to have a specific capacitance such that the oscillating voltage reaches its minimum at a timing of the induced high frequency voltage going positive from negative. The inventors discovered that the selection of the above specific capacitance for the matching capacitor is responsible for giving a maximum charging current to the rechargeable battery and such capacitance is far from that calculated based upon a known concept of tuning the frequency of the high frequency voltage supplied from the power circuit to a resonant frequency of a resonant circuit composed of the matching capacitor and the secondary winding, as disclosed in Japanese Patent Early Publication (KOKAI) No. 6-178464.

However, since the above system is designed to provide a supply current in the form of a pulse to the rechargeable battery, it is likely to bring about a noise due to the discontinuity of the supply current. Also because of that the supply current having a relatively large peak flows through the secondary winding and a diode rectifier, there may be a considerable loss in these elements. Thus, the above system is found to be applicable only to the system of providing relatively small supply current where the loss is not critical. Therefore, it has been desired to accomplish a like system capable of providing a relatively large supply current of substantially uniform level, yet with an optimum transmission efficiency.

SUMMARY OF THE INVENTION

The present invention has been achieved in view of the above problem to provide an improved non-contact electrical power transmission system which is capable of providing a large supply current of uniform level at an optimum transmission efficiency. The system in accordance with the present invention includes a power circuit including a power supply of providing a high frequency voltage across a power winding, and a load circuit for energizing the load. The load circuit is enclosed in a load housing which is detachable to a source housing enclosing the power circuit. The load circuit is composed of a secondary winding, a matching capacitor, a rectifier, and a choke coil. The secondary winding is magnetically coupled to the power winding when the load housing is attached to the source housing, so as to generate an induced high frequency voltage and to provide a leakage inductance to the load circuit. The matching capacitor is connected across the secondary winding and is cooperative with the leakage inductance and with the secondary winding to form an oscillatory circuit which provides an oscillating voltage across the matching capacitor for generating a supply current being fed through the rectifier and the choke coil to the load. The matching capacitor is selected to have a specific capacitance such that the oscillating voltage reaches its extreme each time the inducted high frequency voltage reverses its polarity. The choke coil is connected in series between the secondary winding and the load to smoothen the supply current.

With this arrangement, the supply current of uniform level can be fed to the load, reducing a possibility of incurring a noise on the supply current, yet minimizing an impedance between the power circuit and the load circuit for realizing an optimum efficiency of converting the high frequency voltage into the supply current.

The rectifier may be a half-wave rectifier having a diode which is connected between one end of the matching capacitor and the choke coil. A fly-wheel diode is connected in series with the choke coil across the load so as to allow the choke coil to release a current which is additive to a current flowing through the diode to realize the constant supply current.

The secondary winding may be configured to have a center tap between first and second coil ends of the secondary winding so as to form a first path connecting the load between the first coil end and the center tap and a second path connecting the load between the second coil end the center tap. In this circuit configuration, the rectifier is composed of first and second diodes, the first diode being inserted in series with the choke coil in the first path and the second diode being inserted in series with the choke coil in the second path.

Further, the rectifier may be a full-wave rectifier in the form of a diode-bridge having input ends and output ends, the input ends being connected across the matching capacitor, and the output ends being connected across a series combination of the choke coil and the load.

The load may be a rechargeable battery to be charged by the supply current or a resistive load to be energized by the supply current.

When the load is other than the rechargeable battery or the resistive load, a smoothing capacitor is connected across the load to maintain the voltage accumulated in the load at a constant level. In other words, the load can be made to have a constant voltage level within each cycle of the high frequency voltage supplied to the load circuit, i.e., the secondary winding. Such load may be termed as a constant voltage load and can be successfully energized by the present invention with an optimum efficiency of converting the high frequency voltage into the voltage of the load.

The high frequency voltage generated at the power winding may be in the form of a square wave, or sinusoidal wave. Further, the square wave may be shaped to have sloping rising and falling edges.

These and still other objects and advantageous features of the present invention will become more apparent from the following description of the preferred embodiments when taken in conjunction with the attached drawings.

DETAILED DESCRIPTION OF THE EMBODIMENTS

First Embodiment <FIGS. 1 to 5>

Referring now to FIGS. 1 to 5, there is shown a non-contact electrical power transmission system for charging a rechargeable battery 40 from a high frequency voltage source in accordance with a first embodiment of the present invention. The system comprises a power circuit or charger circuit 10 mounted in a source housing 1, and a load circuit or battery circuit 30 mounted in a separate load housing 3 detachable to the source housing 1. The charger circuit 10 includes an inverter 12 as a power supply which provides from a DC voltage source 11 a high frequency voltage of 140 V at a frequency f of 79 kHz across a power winding 21. The inverter 12 is of a known bridge configuration comprising a pair of series combination of transistor switches 13 and 14 connected across the DC voltage source 11, and a pair of capacitors 15 and 16 connected across the DC voltage source 11. The power winding 21 is inserted between the connection of switches 13 and 14 and the connection of capacitors 15 and 16. The transistor switches 13 and 14 are controlled to alternately turn on and off to provide the high frequency voltage across the power winding 21.

Figure 1:
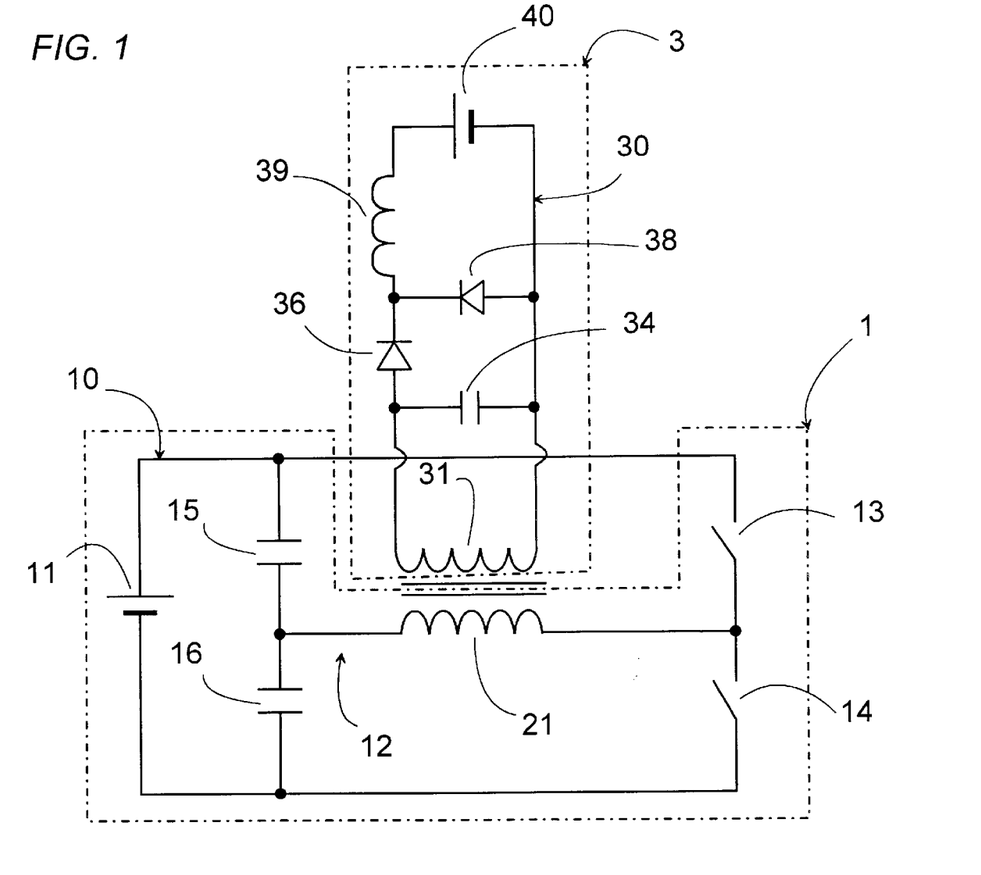
FIG. 1 is a circuit diagram of a non-contact electrical power transmission system in accordance with a first embodiment of the present invention.
Figure 2:
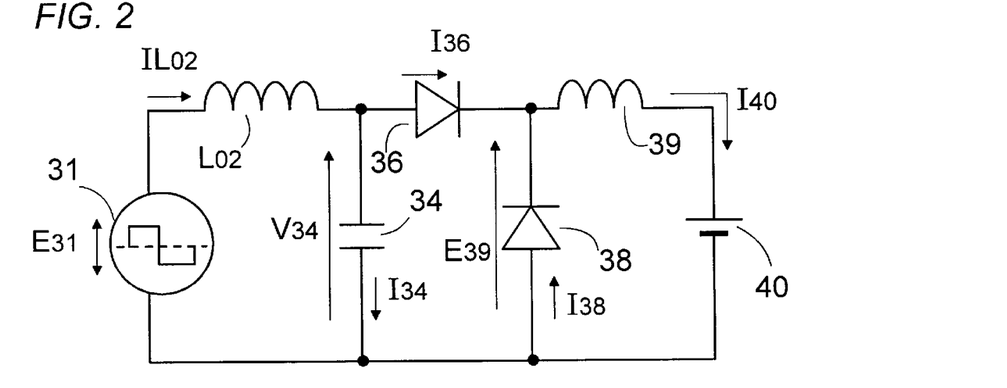
FIG. 2 is an equivalent circuit diagram of FIG. 1.
Figure 3:
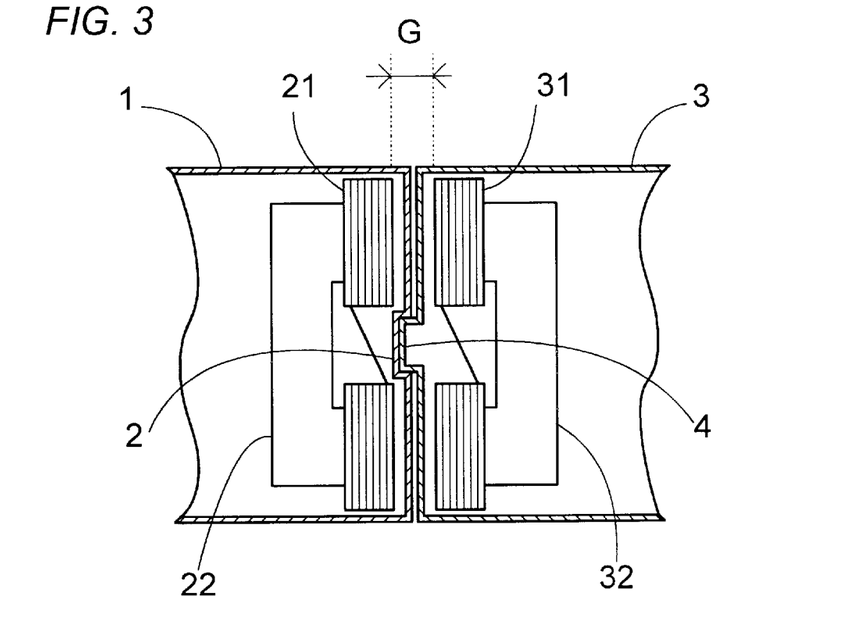
FIG. 3 is a partial view illustrating a transformer with a power winding and a secondary winding respectively mounted in detachable source and load housings.

The battery circuit 30 comprises a secondary winding 31, a matching capacitor 34 connected across the secondary winding 31, a rectifier diode 36, a choke coil 39 and a load in the form of the rechargeable battery 40. The secondary winding 31 is magnetically coupled to the power winding 21 to generate an induced high frequency voltage when the load housing 3 is attached to the source housing 1. As shown in FIG. 3, the load housing 3 is attached to the source housing 1 with a convex 4 of the load housing 3 being fitted into a corresponding concave 2 of the source housing 1, leaving a gap distance G of 4 mm between the power winding 21 and the secondary winding 32 which are wound about respective C-shaped cores 22 and 32. The secondary winding 31, when coupled to the primary winding 21, gives a leakage inductance L02 to the battery circuit 30. As shown in an equivalent circuit diagram of FIG. 2, the leakage inductance L02 is inserted in series with the matching capacitor 34 across the secondary winding 31 so that the matching capacitor 34 is cooperative with leakage inductance L02 and secondary winding 31 to form an oscillating circuit which provides an oscillating voltage V34 across capacitor 34. Leakage inductance L02 can be measured experimentally or determined by the following equation:

$$L02 = (1-k^2) \cdot L31$$

where $$k = \frac{M}{\sqrt{L21 \cdot L31}},$$

L21 and L31 are self-inductances of power winding 21 and secondary winding 31, and M is a mutual inductance between windings 21 and 31.

The rectifier diode 36 rectifies the induced high frequency voltage developed across the secondary winding 31 and the oscillating voltage accumulated across the matching capacitor 34 to provide a supply current I40 which is fed through the choke coil 39 to charge the battery 40. A fly-wheel diode 38 is inserted in series with the choke coil 39 across the battery 40 to pass therethrough a current I38 which is released from choke coil 39 and is additive to a rectified current I36 flowing through rectifier diode 36 to give the supply current I40, as will be discussed below.

Figure 4:
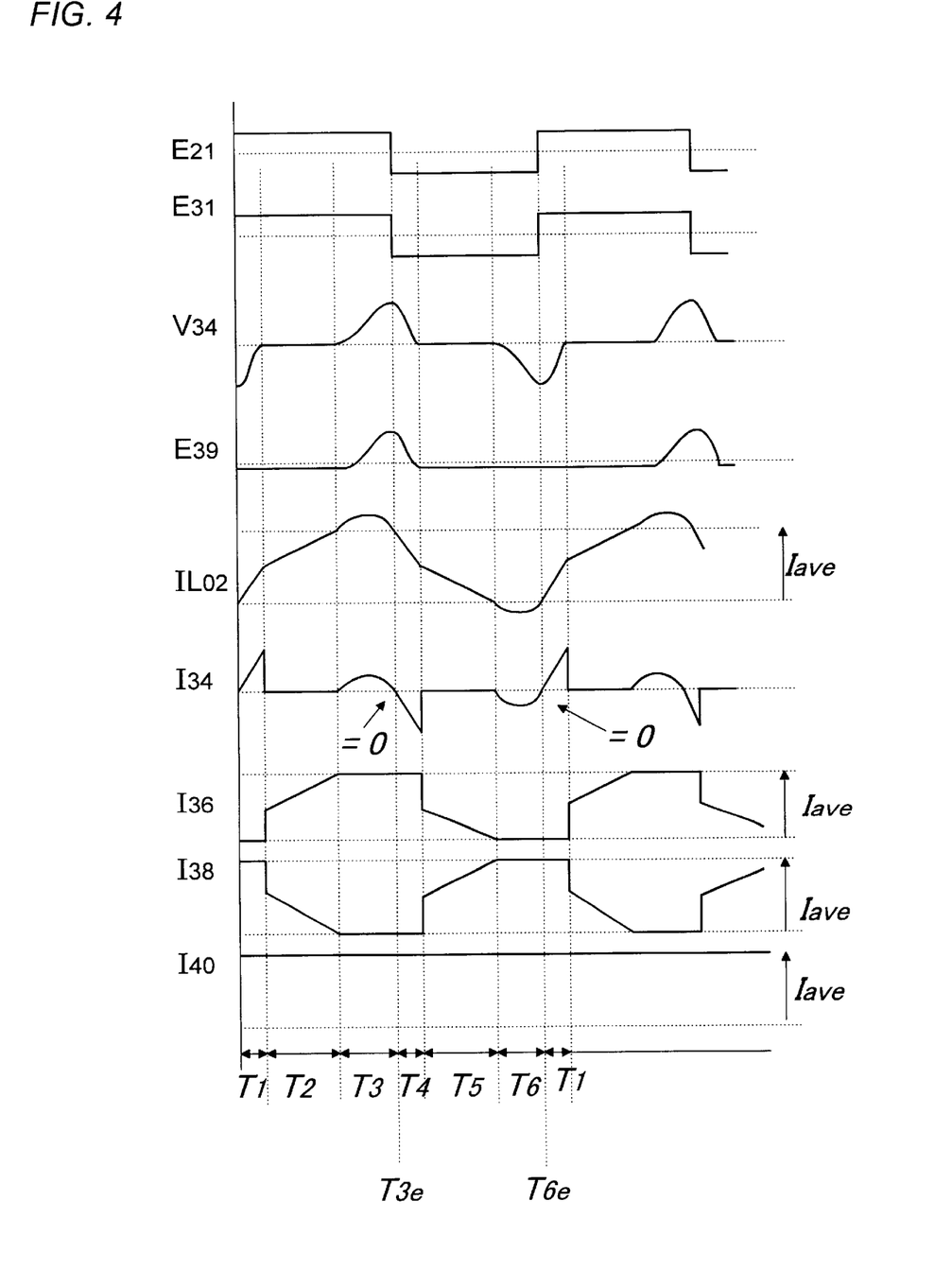
FIG. 4 is a graph illustrating waveforms at various points in the circuit of FIG. 2.

Operation of the battery circuit 30 is now discussed with reference to the equivalent circuit diagram of FIG. 2 and to a chart of FIG. 4 which shows current and voltages at various points depicted in FIG. 2. Firstly, it is noted that the matching capacitor 34 is determined to have a specific capacitance such that the oscillating voltage V34 appearing across matching capacitor 34 reaches its maximum and its minimum at timings (T3e; T6e) when the induced high frequency voltage E31 across the secondary winding 31 or the high frequency voltage E21 across the primary winding 21 reverses its polarity. The determination of the specific capacitance is made in consideration of the leakage inductance L02 and the voltage of the battery 40, in addition to other actual components of the battery circuit 30. From the equivalent circuit of FIG. 2, it is known that IL02=I36+I34 and that I36+I38=I40.

During period T1 where the high frequency voltages E21 and E31 have just gone positive, voltage V34 across matching capacitor 34 increases from its minimum to zero, while current I38 through diode 38 becomes alone responsible for current I40 fed to rechargeable battery 40, while current I36 through diode 36 is kept zero. Also, voltage E39 applied to choke coil 39 is kept almost zero or actually at a level below a ground level by a voltage drop through diode. This is because of that, choke coil 39 releases its energy to continue flowing a current I38 through a closed circuit of fly-wheel diode 38 and battery 40 after the high frequency voltage E31 goes negative in a preceding period to stop supplying the corresponding voltage to choke coil 39. During period T6 immediately preceding to period T1, the oscillating circuit provides an oscillating current I34 which is subsequently goes positive in period T1 in response to the high frequency voltage going positive.

During a subsequent period T2 where voltage V34 remains zero, diode 36 becomes conductive to increase current I36 through diode 36 while current I38 through diode 38 decreases in such a relation that the sum of the currents I40(=I36+I38) is kept at a constant level Iave. During this period T2, voltage E39 remains around zero due to the conduction of diode 38, and voltage V34 across matching capacitor 34 is kept zero due to the conduction of diode 36.

During a period T3 where diode 38 becomes non-conductive, the oscillating voltage V34 increases with a corresponding increase in voltage E39, diode 38 becomes non-conductive so that current I36 through diode 36 becomes alone responsible for the supply current I40. Also, current IL02 through leakage inductance L2 still increases, due to the continued application of the high frequency voltage E31, thereby energizing the oscillating circuit and keeping a constant current I36, i.e., the supply current I40 fed to the battery 40.

During a period T4 which starts from a timing T3e where the high frequency voltage E31 reverses its polarity from positive to negative, the oscillating voltage V34 decreases from its maximum to cause the oscillating current I34 through capacitor 34 to go negative. In this period, diode 36 is kept conductive to continue flowing current I36 which is alone responsible for the constant supply current I40.

During a subsequent period T5 where the oscillating voltage V34 is kept zero with the high frequency voltage E31 being negative, choke coil 39 releases its energy to flow current I38 through diode 38 and battery 40, which current is additive to the decreasing current I36 through diode 36, thereby maintaining the supply current I40 at a constant level Iave.

During period T6 which ends at a timing T6e where the high frequency voltage E31 reverses its polarity from negative to positive, the oscillating voltage V34 decreases from zero to a minimum so that diode 36 becomes non-conductive, while choke coil 39 continues to flow current I38 which is constant and alone responsible for the supply current I40.

The above cycle composed of periods TI to T6 is repeated to continue supply the constant supply current I40 through choke coil 39 to the battery 40 for charging thereof. As discussed in the above, because of the provision of the choke coil 39 and also because of the selection of the capacitance of matching capacitor 34 to coincide each polarity reversal of the high frequency voltage E31 with timings where the oscillating voltage V34 reaches its maximum and minimum, the constant supply current I40 is supplied to the battery 40 or the load at an optimum efficiency. The optimum efficiency obtained in the present invention is demonstrated in FIG. 5 which plots test results showing an averaged supply current Iave varying with differing capacitance of matching capacitor 34. The test results were obtained under the following conditions, as listed in Table below.

TABLE

| Marks | Contents | values |
| --- | --- | --- |
| $E_{31}$ (V) | HF voltage generated across power winding 21 | 140 |
| $E_{40}$ (V) | battery voltage | 1.5 \|2.9\| 4.1 |
| $f$ (kHz) | frequency of voltage across power winding 21 | 79 |
| G (mm) | gap distance between power winding 21 and secondary winding 31 | 2 |
| $L_{21}$ (mH) | self-inductance of power winding 21 | 1.83 |
| $L_{31}$ ($\mu$H) | self-inductance of secondary winding 31 | 24 |
| M ($\mu$H) | Mutual inductance | 122 |
| $L_{02}$ ($\mu$H) | Leakage inductance | 16 |

Figure 5:
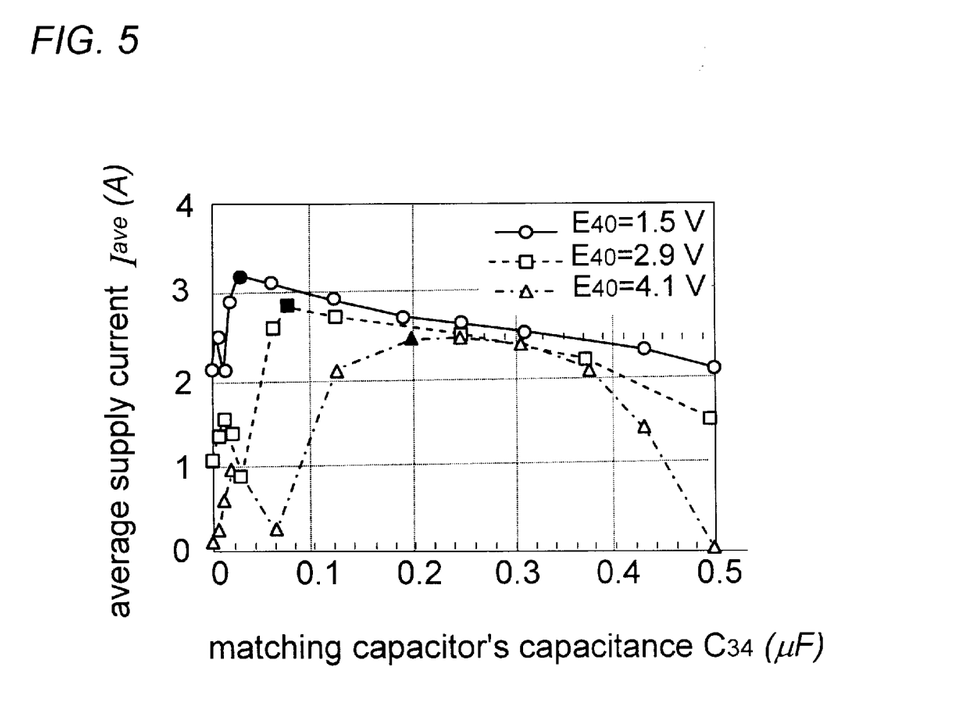
FIG. 5 is a graph illustrating optimum capacitances determined by the system of FIG. 1 for different load requirements.

In FIG. 5, the specific capacitances of matching capacitor 34 determined for the differing load requirements of E40= 1.5 V, 2.9 V, and 4.1 V are shown by black marks, i.e., ●, ■, ▲, respectively. It is also known from FIG. 5 that the specific capacitance assuring the maximum supply current Iave depends upon the voltage E40 of battery 40. While, on the other hand, the load voltage is not considered in the known technique for selecting the capacitance of capacitor 34 that satisfies to match the resonant frequency of an L-C resonant circuit of capacitor 34 and secondary winding 31 to the frequency of the high frequency voltage applied to the power winding 21, in accordance with the following equation.

$$C34 = \frac{1}{L \cdot (2\pi \cdot f)^2} \quad [1]$$

In fact, the capacitances obtained in the known technique are 0.17 $\mu$F and 0.25 $\mu$F respectively when the inductance L of the resonant circuit is calculated based on the self-inductance of secondary winding (L=24 $\mu$H), and the inductance L is calculated based on the leakage inductance L02 (L=16 $\mu$H). In contrast, the specific values defined in the present invention for the differing load conditions E40=1.5 V, 2.9 V, and 4.1 V are 0.03 $\mu$F, 0.08 $\mu$F, and 0.2 $\mu$F all of which are smaller than the above capacitances obtained in the known technique.

Figure 6:
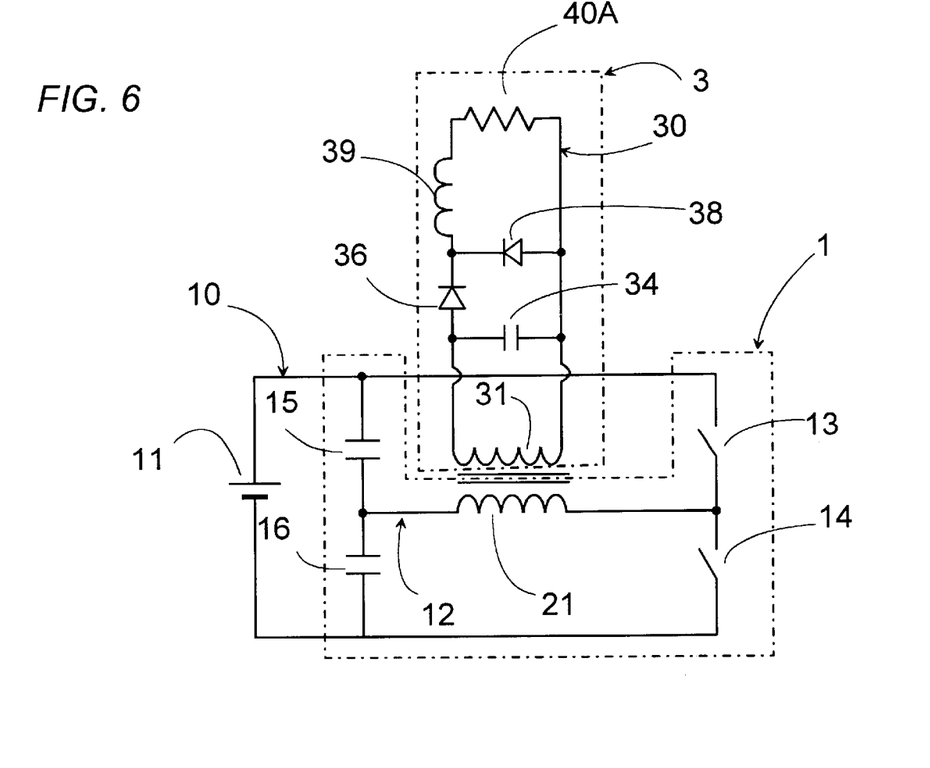
FIG. 6 is a circuit diagram of a modification of the above system.

Although the above embodiment discloses the rechargeable battery as the load energized by the supply current, the load may be a resistive load 40A as shown in FIG. 6, which is a modification of the above embodiment. Since the constant supply current is fed to the load 40A, a constant voltage is developed at the resistive load 40A and can be therefore well incorporated in determining an optimum capacitance of the matching capacitor 34 for satisfying the above mentioned relation that the oscillating voltage reaches its extreme each time the inducted high frequency voltage reverses its polarity.

Figure 7:
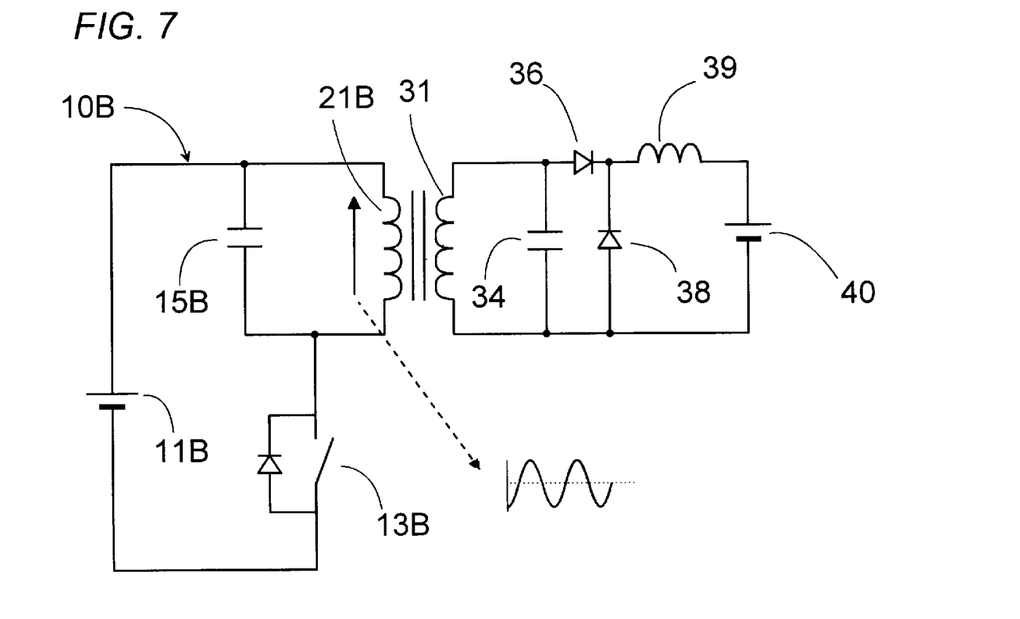
FIG. 7 is a circuit diagram of another modification of the above system.

FIG. 7 shows another modification of the above embodiment which is identical to the above embodiment except that a charger circuit 10B is configured to provide a high frequency voltage of a sinusoidal waveform. The charger circuit 10B includes as the power supply a DC—DC converter having a transistor switch 13B connected in series with a power winding 21B across a DC-voltage source 11, and a capacitor 15B connected across the power winding 21B. The switch 13B is controlled to turn on and off in synchronism with a frequency of an oscillating circuit of the power winding 21B and capacitor 15B, generating the high frequency voltage across the power winding 21B, which is transmitted through secondary winding 31 of the battery circuit 30 to charge the battery 40, in a manner as discussed in the above embodiment. Also in this embodiment, the capacitance of matching capacitor 34 is selected to satisfy the above mentioned relation that the oscillating voltage reaches its extreme each time the inducted high frequency voltage reverses its polarity, providing the constant supply current at an optimum efficiency.

Figure 8:
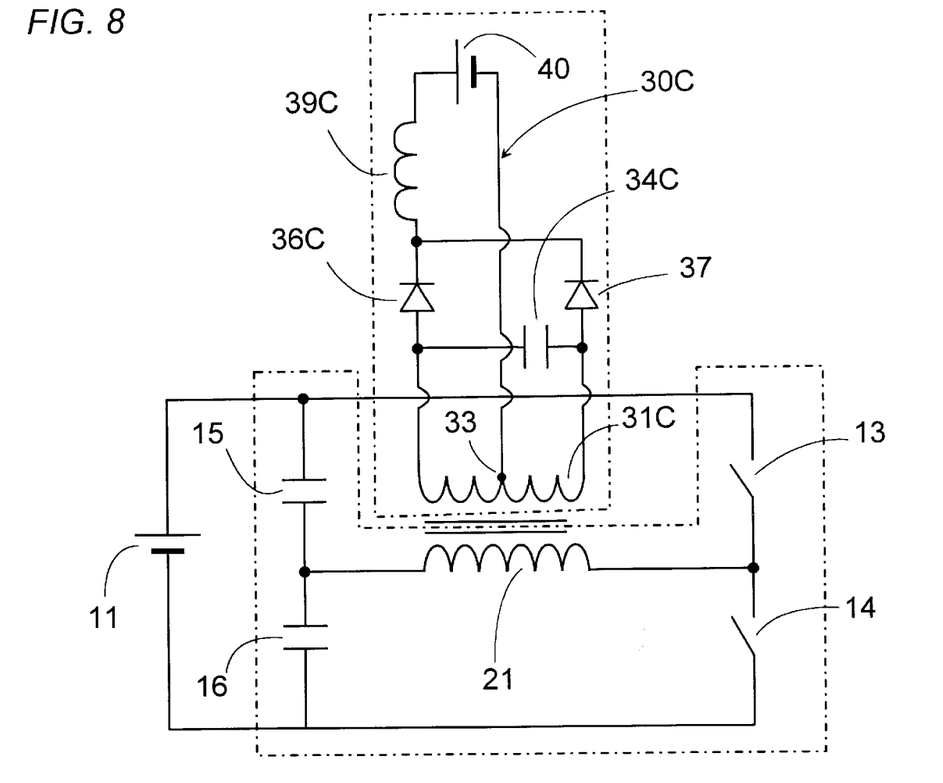
FIG. 8 is a circuit diagram of a non-contact electrical power transmission system in accordance with a second embodiment of the present invention.
Figure 9:
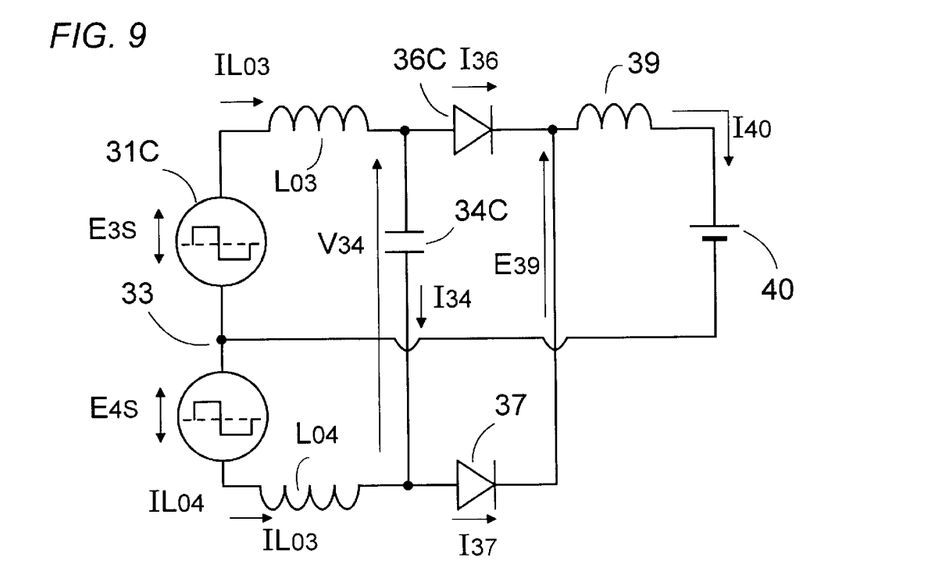
FIG. 9 is an equivalent circuit diagram of FIG. 8.

Second Embodiment <FIGS. 8 to 1>

Referring to FIGS. 8 to 11, there is shown a non-contact electrical power transmission system for charging a rechargeable battery from a high frequency voltage source in accordance with a second embodiment of the present invention. The system of the second embodiment is identical to the first embodiment except for the use of a secondary winding 31C with a center tap 33. A battery circuit 30C is configured to have a first path connecting the battery 40 between a first coil end and the center tap 33 of the secondary winding 31C, and a second path connecting the same battery 40 between a second coil end and the center tap 33. A like matching capacitor 34C is connected across the secondary winding 31C to form a like oscillating circuit with leakage inductances L03 and L04 of the secondary winding 34C in the manner as in the first embodiment. A rectifier is composed of a diode 36C and 37 which are inserted together with a common choke coil 39C respectively in the first and second path to provide a full-wave rectification of the induced high frequency voltage as well as the oscillating voltage appearing across the matching capacitor 34C. In an equivalent circuit diagram of FIG. 9 and a waveform chart of FIG. 10, the secondary winding 31C is shown to have two high frequency voltage sources E3S and E4S opposite of the center tap 33 with corresponding leakage inductances L03 and L04, where L03=L04=L02/2.

Figure 10:
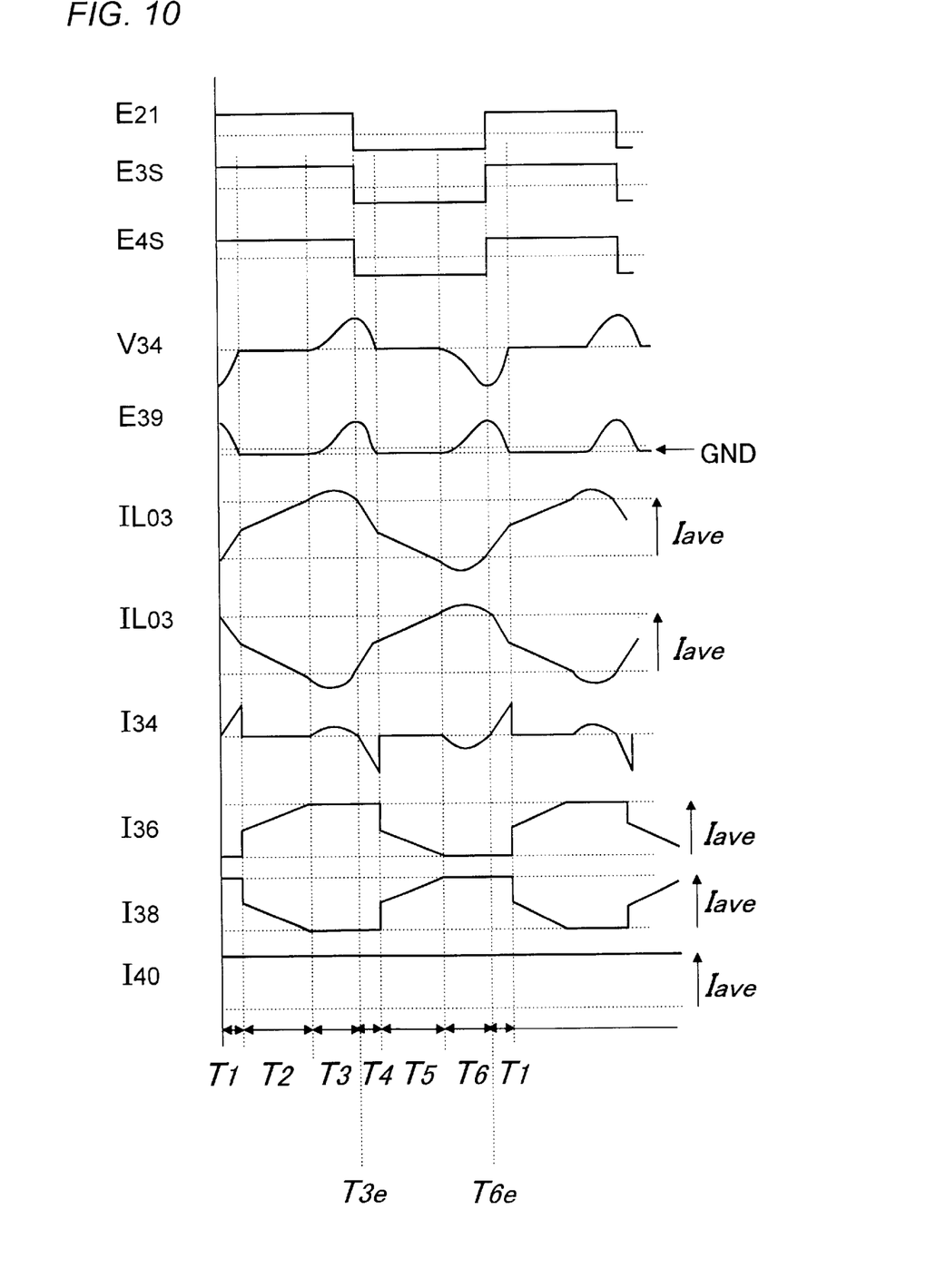
FIG. 10 is a graph illustrating waveforms at various points in the circuit of FIG. 9.

As in the first embodiment, capacitance of matching capacitor 34C is determined to satisfy the relation that the oscillating voltage V34 reaches its extreme each time the inducted high frequency voltage E3S or E4S reverses its polarity at timings T3e and T6e in FIG. 10. The operation of the battery circuit 30C shown in FIG. 10 is similar to that of the first embodiment.

Figure 11:
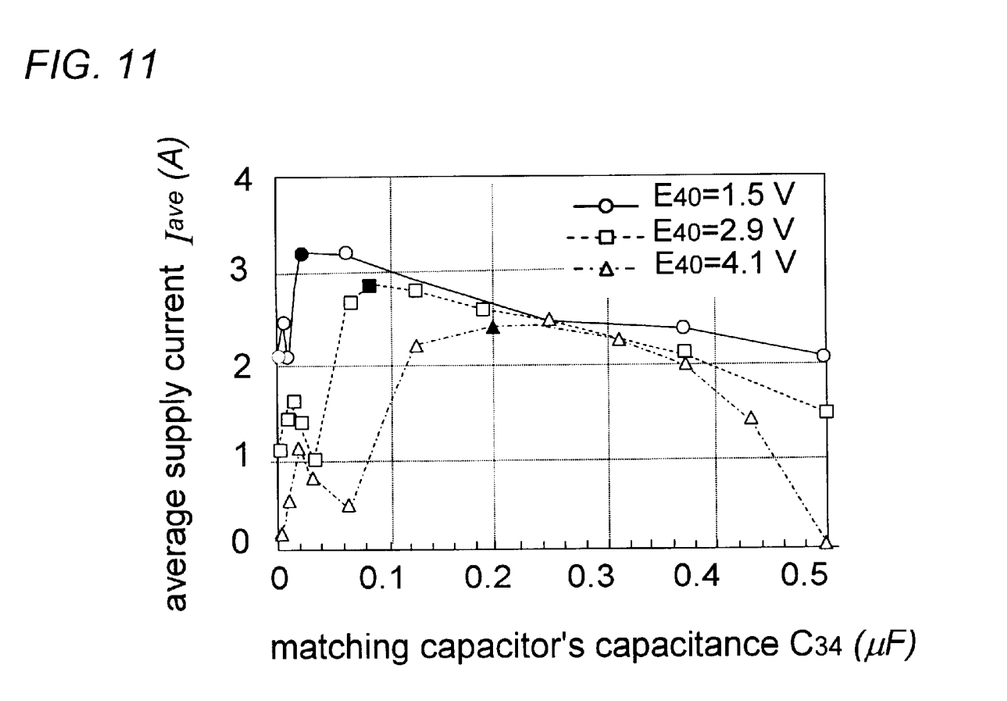
FIG. 11 is a graph illustrating optimum capacitances determined by the system of FIG. 8 for different load requirements.

Also in this embodiment, the optimum efficiency for transmitting the high frequency voltage into the constant supply current I40 is obtained as demonstrated in FIG. 11, which plots test results showing an averaged supply current Iave varying with differing capacitance of matching capacitor 34C. The test results were obtained under the conditions as listed in the above Table.

In FIG. 11, the specific capacitances of matching capacitor 34C defined for the differing load requirements of E40=1.5 V, 2.9 V, and 4.1 V are shown by black marks, i.e., ●, ■, ▲, respectively. As is known from FIG. 11, the selected specific capacitances of matching capacitor 34C for the differing load conditions E40=1.5 V, 2.9 V, and 4.1 V are 0.03 μF, 0.07 μF, and 0.20 μF all of which are smaller than capacitances to be obtained in the known technique using the above equation [1]. In fact, the capacitances obtained in the known technique are 0.17 μF and 0.25 μF respectively when the inductance L of the resonant circuit is calculated based on the self-inductance of secondary winding (L=24 μH), and the inductance L is calculated based on the leakage inductance L02 (L=16 μH).

Figure 12:
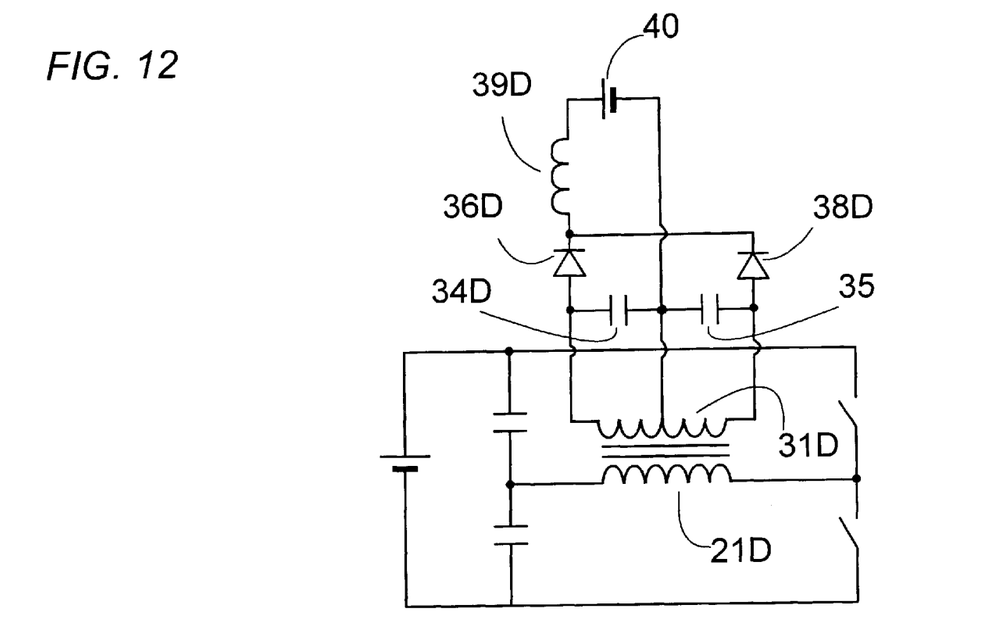
FIG. 12 is a circuit diagram of a modification of the above system of the second embodiment.

As shown in FIG. 12 which is a modification of the second embodiment, two matching capacitors 34D and 35 may be connected respectively across the halves of the secondary winding 31D, instead of using a single matching capacitor across the secondary winding. Like components are designated by like numerals with a suffix letter of "D" where appropriate.

Figure 13:
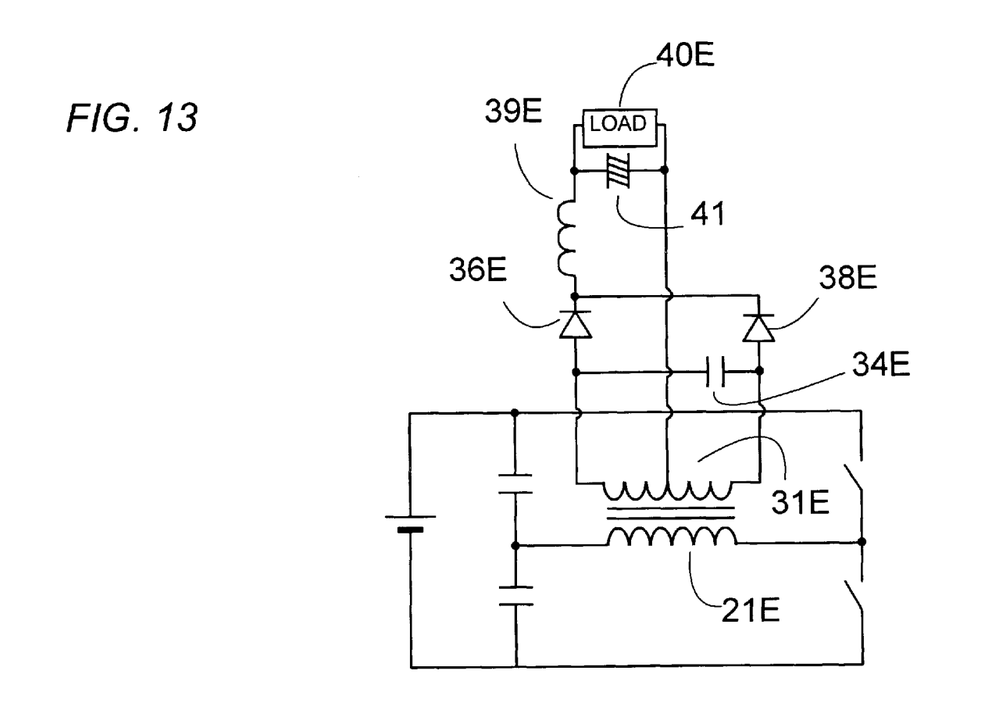
FIG. 13 is a circuit diagram of another modification of the above system of the second embodiment.

FIG. 13 shows another modification of the second embodiment which is identical to the second embodiment except for an inclusion of a smoothing capacitor 41 connected across a load 40E for smoothing the voltage appearing at the load 40E. Thus, the load other than the battery or resistive load can be utilized as providing a constant voltage, which enables to determine an optimum capacitance of matching capacitor 34E as in the second embodiment.

Figure 14:
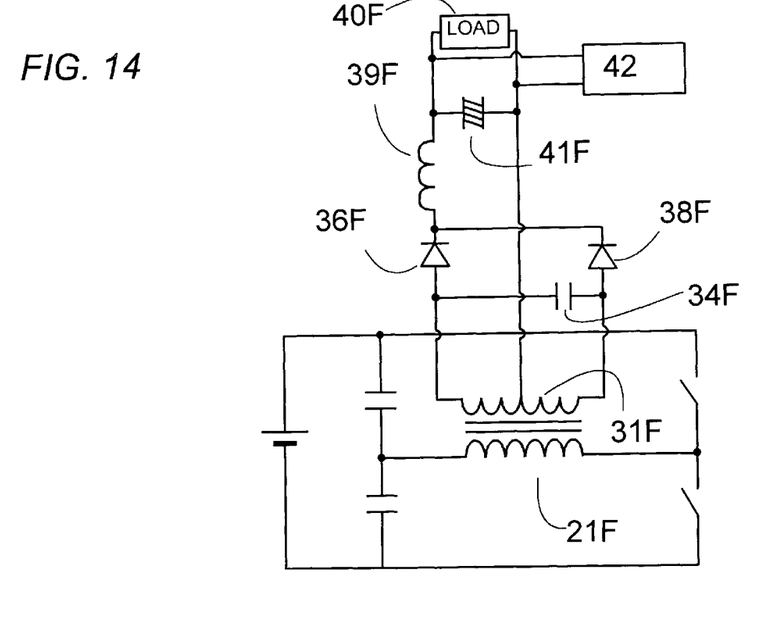
FIG. 14 is a circuit diagram of a further modification of the above system of the second embodiment.

A further modification of the second embodiment is shown in FIG. 14 which is identical to the second embodiment except for the inclusion of a smoothing capacitor 41F across a load 40F as well as a voltage regulator 42 which regulates a voltage appearing across the load 40F at a constant level. Thus, also in this modification, the load other than the battery or resistive load can be utilized as providing a constant voltage, which enables to determine an optimum capacitance of matching capacitor 34F as in the second embodiment.

Figure 15:
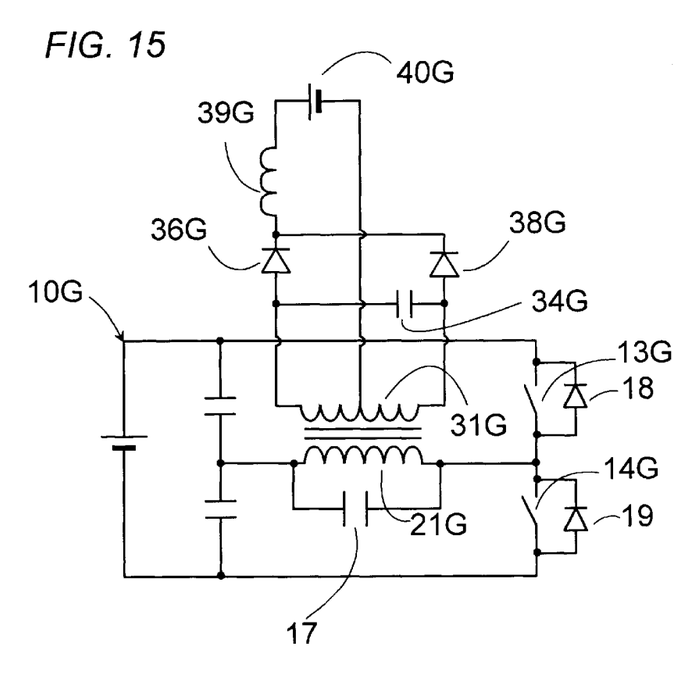
FIG. 15 is a circuit diagram of a still further modification of the above system of the second embodiment.
Figure 16:
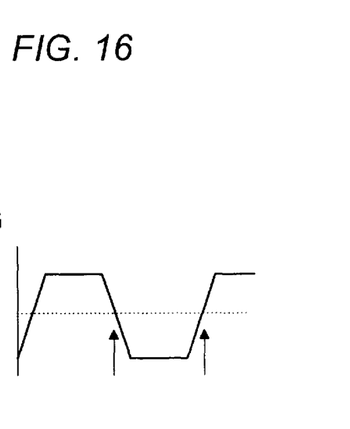
FIG. 16 is a waveform of a high frequency voltage generated across a power winding of the modified system of FIG. 15.
Figure 17:
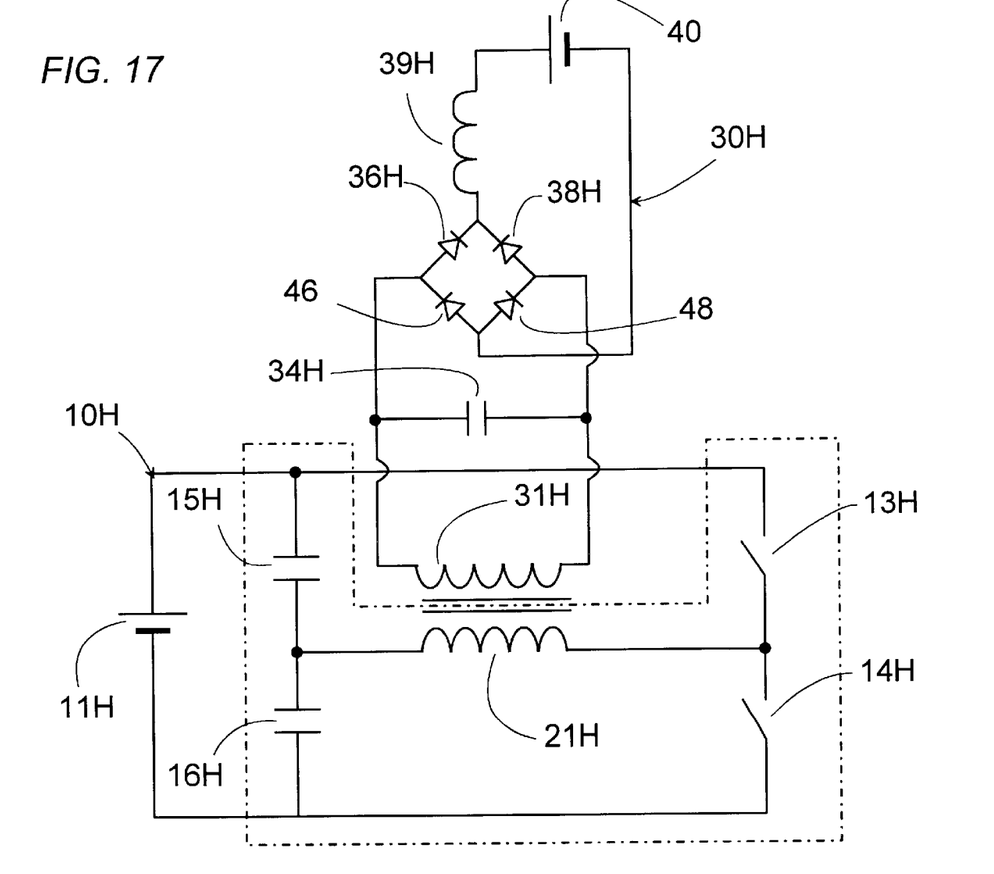
FIG. 17 is a circuit diagram of a non-contact electrical power transmission system in accordance with a third embodiment of the present invention.

FIG. 15 shows a still further modification of the second embodiment which is identical to the second embodiment except that a charger circuit 10G is configured to provide a high frequency voltage of a generally rectangular waveform but having sloping rising and falling edges, as shown in FIG. 16, for increasing an efficiency of the charger circuit as well as reducing switching noises. The charger circuit 10G includes an oscillation-inducing capacitor 17 connected across power winding 21G and employs FET switches 13G and 14G respectively with inherent parasitic diodes 18 and 19. FET switches 13G and 14G are controlled to be alternately turned on and off in such a manner to have a short dead-period where both FET switches are kept turned off, which is responsible for providing the high frequency voltage having the waveform of FIG. 16 in cooperation with an oscillating circuit composed of the capacitor 17 and the power winding 21G. Also in this modification, an optimum capacitance of the matching capacitor 34G is determined to satisfy the relation that the oscillating voltage reaches its extreme each time the inducted high frequency voltage reverses its polarity at timings as indicated by arrows in FIG. 16.

Third Embodiment <FIGS. 17 to 20>

Figure 18:
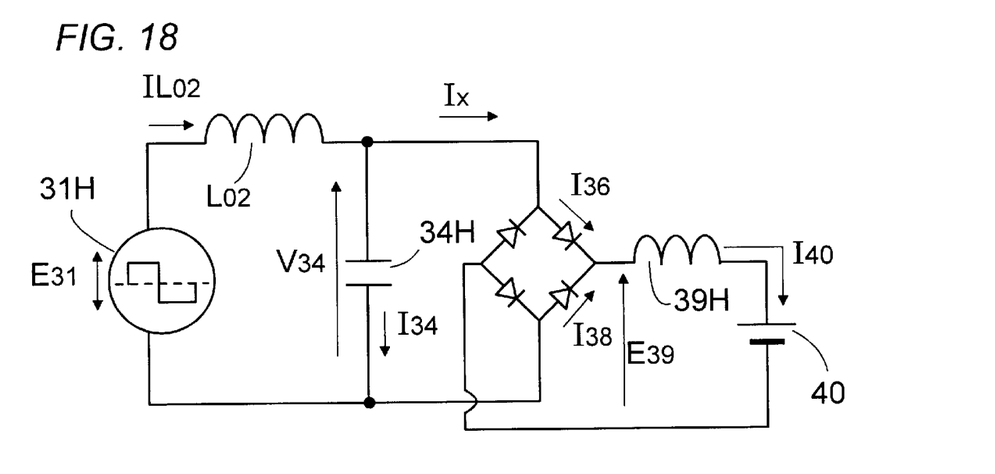
FIG. 18 is an equivalent circuit diagram of FIG. 17.
Figure 19:
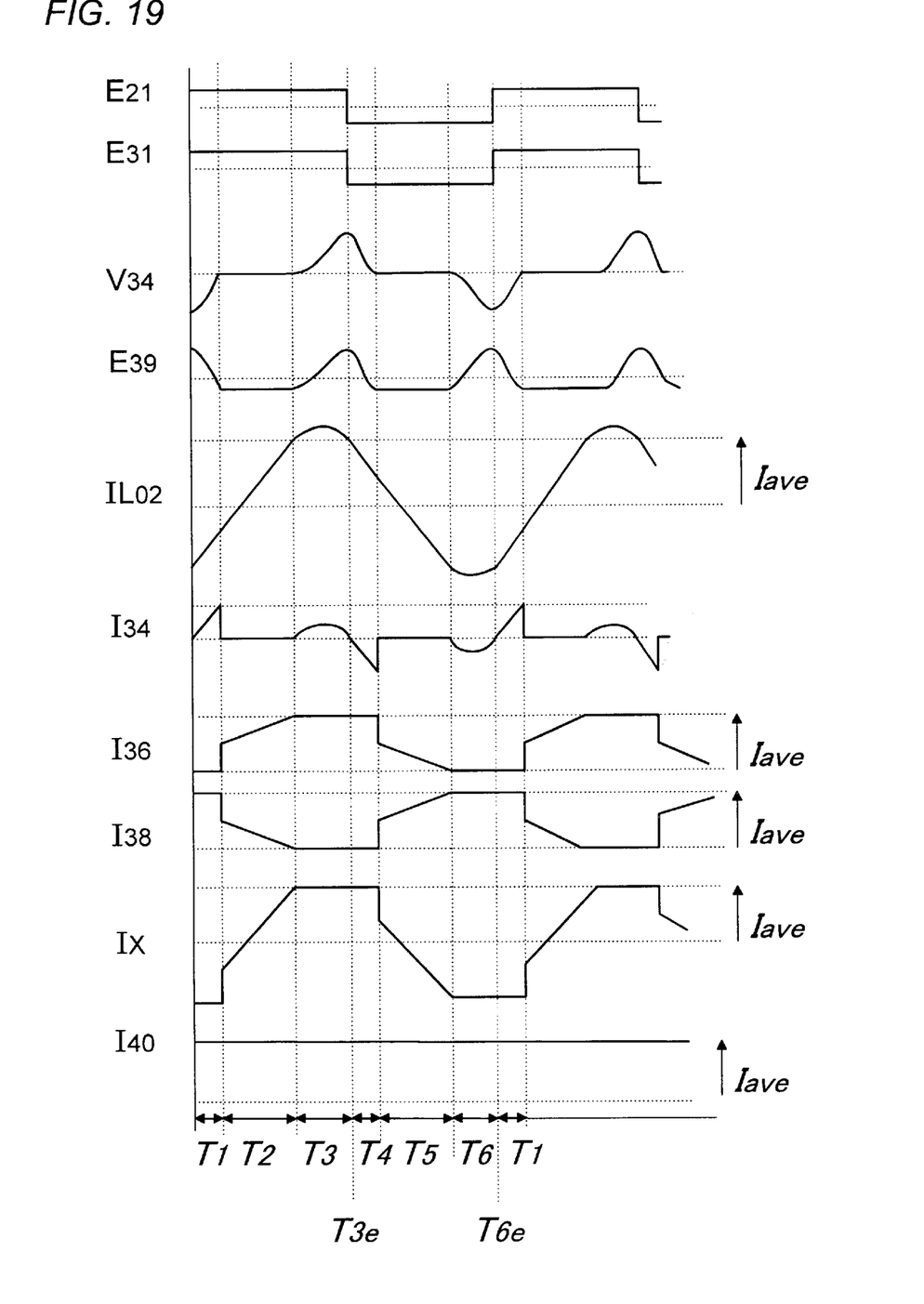
FIG. 19 is a graph illustrating waveforms at various points in the circuit of FIG. 17.

FIGS. 17 to 20 show a non-contact electrical power transmission system for charging a rechargeable battery from a high frequency voltage source in accordance with a third embodiment of the present invention. The system of the third embodiment is identical to the first embodiment except for the use of a diode bridge composed of diodes 36H, 46, 38H, and 48 as a full-wave rectifier. Like components are designated by like numerals with a suffix letter of "H". The diode bridge has its input terminals connected across a matching capacitor 34H and has its output terminals connected across the battery 40 with a choke coil 39H inserted in series with battery 40. Thus, the induced high frequency voltage developed across secondary winding 31H as well as the oscillating voltage appearing across smoothing capacitor 34H are rectified to give a resulting supply current to battery 40 through choke coil 39H. An equivalent circuit diagram of thus configured load circuit 30H and its circuit operation charts are shown respectively in FIG. 18 and in waveform charts of FIG. 19. In these figures, secondary winding 31H is shown to have a corresponding leakage inductance L02. Waveforms of currents and voltages at various points in the equivalent circuit of FIG. 18 are shown in FIG. 19.

As in the first embodiment, the capacitance of matching capacitor 34H is determined to satisfy the relation that the oscillating voltage V34 reaches its extreme each time the inducted high frequency voltage E21 or E31 reverses its polarity at timings T3e and T6e in FIG. 19. The operation of the battery circuit 30H shown in FIG. 10 is similar to that of the first embodiment.

Figure 20:
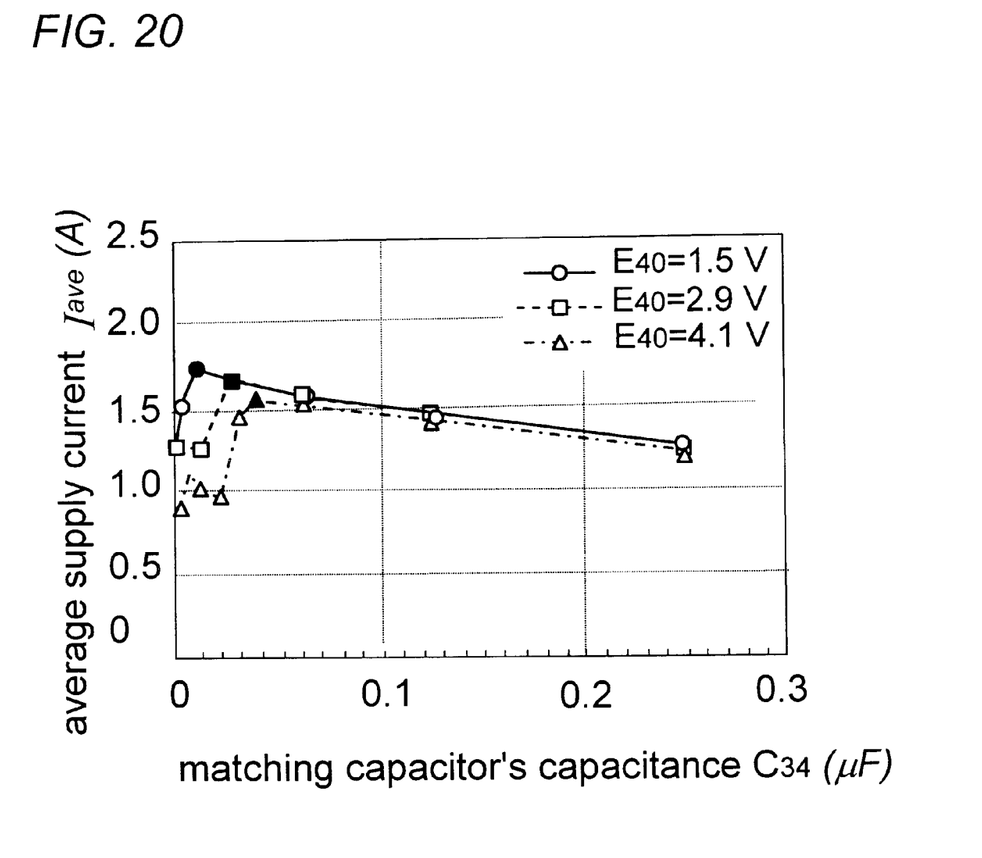
FIG. 20 is a graph illustrating optimum capacitances determined by the system of FIG. 17 for different load requirements.

Also in this embodiment, the optimum efficiency for transmitting the high frequency voltage into the constant supply current I40 is obtained as demonstrated in FIG. 20, which plots test results showing an averaged supply current Iave varying with differing capacitance of matching capacitor 34H. The test results were obtained under the same conditions as listed in the above Table.

In FIG. 20, the specific capacitances of matching capacitor 34H defined for the differing load requirements of E40=1.5 V, 2.9 V, and 4.1 V are shown by black marks, i.e., ●, ■, ▲, respectively. As is known from FIG. 20, the selected specific capacitances of matching capacitor 34H for the differing load conditions E40=1.5 V, 2.9 V, and 4.1 V are 0.01 $\mu$F, 0.025 $\mu$F, and 0.04 $\mu$F which are far smaller than capacitances to be obtained in the known technique using the above equation [1]. In fact, the capacitances obtained in the known technique are 0.17 $\mu$F and 0.25 $\mu$F respectively when the inductance L of the resonant circuit is calculated based on the self-inductance of secondary winding (L=24 $\mu$H), and the inductance L is calculated based on the leakage inductance L02 (L=16 $\mu$H).

What is claimed is:

1. A non-contact electrical power transmission system comprising:
    a power circuit including a power supply of providing a high frequency voltage and a power winding across which said high frequency voltage is applied, said power circuit being enclosed in a source housing;
    a load circuit for energizing a load, said load circuit enclosed in a load housing which is detachable to said source housing;
    said load circuit comprising:
        a secondary winding,
        a matching capacitor,
        a rectifier, and
        a choke coil,
    said secondary winding being magnetically coupled to said power winding when said load housing is attached to said source housing, so as to generate an induced high frequency voltage in response to said high frequency voltage and to provide a leakage inductance to said load circuit,
    said matching capacitor being connected across said secondary winding to be cooperative with said leakage inductance and with said secondary winding to form an oscillatory circuit which provides an oscillating voltage across said matching capacitor for generating a supply current being fed through said rectifier and said choke coil to said load;
    said choke coil being connected in series between said secondary winding and said load to smoothen said supply current;
wherein
    said matching capacitor is selected to have a specific capacitance such that said oscillating voltage reaches its extreme each time said inducted high frequency voltage reverses its polarity.

2. The system as set forth in claim 1, wherein
    said rectifier is a half-wave rectifier having a diode which is connected between one end of said matching capacitor and said choke coil, a fly-wheel diode being connected in series with said choke coil across said load to allow a current released from the choke coil to flow through the load.

3. The system as set forth in claim 1, wherein
    said secondary winding has a center tap between first and second coil ends of said secondary winding so as to form a first path connecting said load between said first coil end and said center tap and a second path connecting said load between said second coil end and said center tap,
    said rectifier comprises first and second diodes, said first diode being inserted in series with said choke coil in said first path and said second diode being inserted in series with said choke coil in said second path.

4. The system as set forth in claim 1, wherein
    said rectifier is a full-wave rectifier in the form of a diode-bridge having input ends and output ends, said input ends being connected across said matching capacitor, and said output ends being connected across a series combination of said choke coil and said load.

5. The system as set forth in claim 1, wherein
    said load is a rechargeable battery to be charged by said supply current.

6. The system as set fort in claim 1, wherein
    said load is a resistive load.

7. The system as set forth in claim 1, wherein
    a smoothing capacitor is connected across said load to maintain the voltage accumulated in said load at a constant level.

8. The system as set forth in claim 1, wherein
    said high frequency voltage generated at said power winding is in the form of a square wave.

9. The system as set forth in claim 8, wherein
    said power circuit includes a resonant-inducting capacitor, said resonant-inducing capacitor being connected across said power winding to form therewith a resonant circuit by which said high frequency voltage in the form of said square wave is shaped to have sloping rising and falling edges.

10. The system as set forth in claim 1, wherein
    said high frequency voltage generated at said power winding is in the form of a sinusoidal wave.

11. The system as set forth in claim 10, wherein
    said power circuit includes a resonant-inducing capacitor which is connected across said power winding to form therewith a resonant circuit, said resonant circuit being responsible for generating said high frequency voltage in the form of the sinusoidal wave.

* * * * *